United States Patent Office 2,805,245
Patented Sept. 3, 1957

2,805,245
PROCESS FOR THE PRODUCTION OF ESTERS FROM CYCLOHEXENE, CARBON MONOXIDE, AND ALCOHOLS

Giulio Natta, Piero Pino, and Raffaele Ercoli, Turati-Milan, Italy, assignors to Montecatini, Societa Generale per l'Industria Mineraria e Chimica, a corporation of Italy No Drawing. Application July 27, 1954,
Serial No. 446,166

Claims priority, application Italy August 8, 1953

2 Claims. (Cl. 260—468)

The present invention relates to a new process for the production of mono- and polycarboxylic acid esters from cyclohexene, carbon monoxide and alcohols.

Processes for directly obtaining esters by reacting olefines with carbon monoxide and alcohols have been previously disclosed.

These processes employ various catalysts and must be carried out at high temperatures and pressures (above 200° C. and at pressures between 200 and 1000 atm.).

Only one of the known processes for the production of esters, according to a prior disclosure of these inventors, is carried out at a relatively low CO pressure and in the presence of solid catalysts containing cobalt. This process, however, is limited to the use of high boiling olefines, the vapor pressure of which does not exceed 1 atm. at the reaction temperature. It is a slow reaction, accompanied by numerous secondary reactions, and therefore, generally, of little practical interest.

Now it has been found that the synthesis of esters from cyclohexene can be carried out more rapidly, when operating under temperature and pressure conditions which are considerably milder than those previously suggested, if alcoholic solutions of cobalt carbonyls (that is to say compounds of cobalt and carbon monoxide, in which the cobalt is coordinated with the CO and is not present in the form of Co++ ions) are used as catalysts and the operation is carried out at a suitable olefine/alcohol ratio.

It is, therefore, an object of this invention to produce esters of mono- and polycarboxylic acids by reacting cyclohexene with carbon monoxide and an alcohol.

It is a further object to produce these esters at higher yields and with more convenient manufacturing methods than has been hitherto possible, by using a special alcohol soluble catalyst and, in conjunction therewith, lower pressures and temperatures than those employed in the past for similar methods.

These and other objects will become apparent from the subsequent detailed description and from the examples which further illustrate the invention.

According to the present invention high carbon monoxide pressures are not necessary for the preparation of carboxylic acid esters from cyclohexene, carbon monoxide and alcohols; in fact it has been found that the reaction rate does not appreciably change when working at CO pressures greatly in excess of 150 atm.

This is the more surprising since, based on the equation:

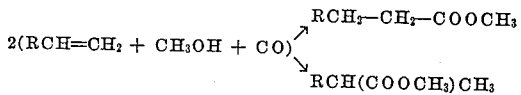

$$2(RCH=CH_2 + CH_3OH + CO) \nearrow^{RCH_2-CH_2-COOCH_3}_{\searrow RCH(COOCH_3)CH_3}$$

an increase of the partial carbon monoxide pressure should theoretically cause an increase of the reaction rate. The lower limit of the partial pressure, at which the reaction takes place, depends on the reaction temperature and may be as low as 10 atm.

An advantage of the present invention is that the reaction can be carried out with adequate speed at a temperature range from 100° to 200° C., say at about 150° to 165° C., and that, in certain cases, all secondary reactions can be almost completely suppressed when using these low operating temperatures.

The use of relatively low pressures and temperatures represents a considerable improvement over the method of British Patent No. 651,853, disclosing the use of cobalt salts of organic acids as catalysts and working with very high concentrations (from 12 to 200 percent, based on the olefine), at total pressures of 600 to 700 atm. and at temperatures of 240° to 250° C., to obtain relatively low conversions of the olefine to the methyl ester (from 11.8 to 49.5%). A further advantage of our process is based on the fact that, while working at low temperatures because of the use of a more active catalyst, substantially all secondary reactions, such as the formation of ethers, aldehyde and acetals caused by the dehydration and dehydrogenation of the alcohol, which accompany the reaction when working according to the afore-mentioned British patent, are avoided. In particular, working with methyl alcohol according to the present disclosure, almost completely eliminates the formation of methyl acetate, which takes place to a considerable degree when operating above 200° C.

The most particular improvement provided by the present invention is the use of definite limitations with respect to the excess of methanol over the amount of cyclohexene. It has been observed that for a given volume of the liquid phase, the reaction rate expressed as a function of the methanol/cyclohexene ratio represents a maximum for a given value of such a ratio.

If the methanol/cyclohexene ratio is increased above a certain value which is characteristic for cyclohexene, the production capacity of a given reactor decreases again. This could not be foreseen on the basis of the stoichiometry of the reaction or be deduced from what has been known of this reaction until now.

For example, in conjunction with the use of cyclohexene at 165° it has been found that a methanol/cyclohexene ratio of 4 is more favorable than methanol/cyclohexene ratios of two or eight. Generally, a molar methanol/olefine ratio of 2 to 10, preferably 3 to 8, should be maintained.

As shown by Examples 2 and 5 of this disclosure, while the reaction of cyclohexene with CO and methanol produces ester yields of 81%, based on the amount of cyclohexene, the reaction of cyclohexene with CO and butyl alcohol under identical temperature and pressure conditions gives much smaller ester yields (45%) and produces considerable amounts of secondary products which, in turn, cause a further decrease in the yield, based on the amount of butyl alcohol.

The process of this invention can be carried out in a continuous or a discontinuous operation.

When using a continuous operation, it is advisable to recirculate the reaction liquid, while carbon monoxide is not recirculated but only supplied in the quantities required by the reaction. The circulation of the liquid, with intermediate cooling, permits a ready dissipation of the reaction heat without the need of high pressure pumps such as would be required for the circulation of gases, aside from the added advantage that the heat exchange coefficient in cooling a circulating liquid is higher than that attainable in cooling a gas. The absence of any circulation of gas has the further advantage of avoiding losses of the catalyst.

A still further advantage of the present invention is the complete recovery of the cobalt. Depending upon the reaction product, the cobalt can be recovered in the form of a salt in passing an air flow through the reaction products, or in the form of metallic cobalt, by heating the reaction product with $H_2$ to a temperature between 100° and 200° C. and at hydrogen pressures between 10 and 200 atm. or preferably by simply heating the reaction liquid until the cobalt has completely precipitated in the form of insoluble compounds, which can be easily separated and, by means of CO at high pressure, again be changed into soluble carbonylic cobalt compounds, for a subsequent reuse as catalyst.

*Example 1*

An oscillating autoclave of 435 cm.³ capacity is charged with 4.5 g. of dicobalt octacarbonyl $(Co(CO)_4)_2$, 100 cm.³ of a solution of 44.4 g. of cyclohexene in 34.7 g. of methyl alcohol, and carbon monoxide at a pressure up to 140 atm. The autoclave is heated to 165° C. (240 atm.) for 7 hours and 30 minutes. Upon distillation of the reaction product, 25.1 g. of unchanged cyclohexene (56.5% of the cyclohexene used) 26.2 g. of methyl hexahydrobenzoate, and 4 g. of other products (mainly hexahydrobenzaldehyde dimethyl acetal) are obtained. The methyl-hexahydrobenzoate yield, based on cyclohexene not recovered (reacted cyclohexene, plus physical losses), is 78%.

*Example 2*

Operating as in Example 1, 4.5 g. of dicobalt octacarbonyl, 100 cm.³ of a solution containing 30.8 g. of cyclohexene in 48 g. of methanol, and carbon monoxyde at a pressure up to 138 atm., are heated to 165° C. (246 atm.) for 6 hours and 15 minutes. Distillation of the reaction product gives 8.6 g. of unchanged cyclohexene (28% of the cyclohexene used), 31.1 g. of methyl hexahydrobenzoate and 2.5 g. of other products (mainly hexahydrobenzaldehyde dimethyl acetal). The methyl-hexahydrobenzoate yield, based on cyclohexene not recovered, (reacted cyclohexene, plus physical losses), is 81%.

*Example 3*

Operating as in Example 1, 4.5 g. of dicobalt octacarbonyl, 100 cm.³ of a solution containing 19.2 g. of cyclohexene in 60 g. of methanol, and carbon monoxide at a pressure up to 145 atm., are heated to 165° C. (242 atm.) for 5 hours and 30 minutes. Distillation of the reaction product gives 2.2 g. of unchanged cyclohexene (11.5% of the cyclohexene used), 24.7 g. of methyl hexahydrobenzoate, and 2 g. of other products. The ester yield based on cyclohexene not recovered is 83%.

*Example 4*

The autoclave of Example 1 is charged with 4.5 g. of dicobalt octacarbonyl, 100 cm.³ of a solution containing 30.8 g. of cyclohexene and 48 g. of methanol, and carbon monoxide at a pressure up to 55 atm. After 6 hours of heating to 165° C. the pressure decreases from 107 to 75 atm. Distillation of the reaction product yields 4.7 g. of unchanged cyclohexene (15.3% of the cyclohexene used), 33.1 g. of methyl hexahydrobenzoate, and 7 g. of other products (mainly hexahydrobenzaldehyde dimethyl acetal). The methyl-hexahydrobenzoate yield, based on cyclohexene not recovered (reacted cyclohexene, plus physical losses), is 74%.

*Example 5*

Operating as in Example 1, 4.5 g. of dicobalt octacarbonyl, 100 cm.³ of a solution containing 17.6 g. of cyclohexene and 63.5 g. of n-butyl alcohol, and carbon monoxide at a pressure up to 150 atm., are heated to 165° C. for 17 hours. Distillation of the reaction product yields 3 g. of cyclohexene (17% of the cyclohexene used), 14.8 g. of butyl hexahydrobenzoate, and 20 g. of other products, n+butyraldehyde, butyraldehyde, dibutyl-acetal, and, primarily; hexahydrobenzaldehyde dibutyl acetal among them. The butyl hexahydrobenzoate yield, based on cyclohexene not recovered (reacted cyclohexene, plus physical losses) is 45%.

*Example 6*

The same autoclave is charged with 4 g. of dicobalt octacarbonyl, 144 g. of methanol, 32 g. of propylene and carbon monoxide at a pressure up to 250 atm. and heated to 135° for twelve hours under oscillation. After cooling the residual gas is removed and 198 g. of a mixture of raw liquid are obtained. By rectification the azeotropic mixture: methyl-isobutyrate methanol, the methanol and finally the methyl butyrate are separated. The total weight of the methyl butyrates obtained is 64 g. The conversion based on the propylene employed is 85%.

*Example 7*

25 g. of methyl-hexahydrobenzoate are dissolved in 39 g. of n-butanol containing 5% of sodium butylate. The mixture is refluxed for an hour and successively slowly rectified with strong reflux, in a Fenske packing column 90 cm. high. First 7 g. of a fraction boiling at 65° to 95° C., mainly consisting of methanol, is separated; successively 23 g. of n+butanol are recovered and finally by distilling the residue under reduced pressure, 31 g. of butyl-hexahydrobenzoate, having a boiling point 115 to 119° C. under 20 mm. Hg are obtained. On the whole the butyl-hexahydrobenzoate yield, starting from cyclohexene and taking into account the first step of conversion (Example 2) is 77%, being therefore much higher than that secured by directly reacting cyclohexene, carbon monoxide and n+butanol (Example 5).

Analogous results as those described are obtained with the synthesis of dicarboxylic esters starting from methyl crotonate, methyl oleate and other unsaturated methyl esters.

Having disclosed our invention, we claim:

1. The process of producing methyl esters of carboxylic acids, which comprises reacting, in a vessel and in the presence of dicobalt octacarbonyl as catalyst, one mol equivalent of cyclohexene, two to ten mol equivalents of methanol and an amount of carbon monoxide gas adjusted to a pressure of 50 to 150 atms. at room temperature, by heating to a temperature of about 165° C. and separating the resulting methyl ester from the other reaction constituents.

2. The process according to claim 1 wherein the dicobalt octacarbonyl catalyst is added in form of a methanol solution.

References Cited in the file of this patent

UNITED STATES PATENTS

| | | |
|---|---|---|
| 1,433,308 | Steffens | Oct. 24, 1922 |
| 2,542,767 | Gresham et al. | Feb. 22, 1951 |
| 2,689,261 | Reppe | Sept. 14, 1954 |

FOREIGN PATENTS

| | | |
|---|---|---|
| 651,853 | Great Britain | Apr. 11, 1951 |